(12) United States Patent
Steiert

(10) Patent No.: US 7,322,711 B2
(45) Date of Patent: Jan. 29, 2008

(54) COMBINED INSTRUMENT

(75) Inventor: Michael Steiert, Villingen-Schwenningen (DE)

(73) Assignee: Siemens AG, München (DE)

( * ) Notice: Subject to any disclaimer, the term of this patent is extended or adjusted under 35 U.S.C. 154(b) by 14 days.

(21) Appl. No.: 10/541,178

(22) PCT Filed: Dec. 10, 2003

(86) PCT No.: PCT/DE03/04065

§ 371 (c)(1),
(2), (4) Date: Jul. 5, 2005

(87) PCT Pub. No.: WO2004/067321

PCT Pub. Date: Aug. 12, 2004

(65) Prior Publication Data

US 2006/0215385 A1    Sep. 28, 2006

(30) Foreign Application Priority Data

Jan. 28, 2003   (DE) ................................ 103 03 308

(51) Int. Cl.
*C01D 11/28* (2006.01)
(52) U.S. Cl. ............................ 362/26; 362/23; 362/28; 362/610; 362/615
(58) Field of Classification Search ............ 362/23–30, 362/610, 615, 489
See application file for complete search history.

(56) References Cited

U.S. PATENT DOCUMENTS

| | | | |
|---|---|---|---|
| 4,207,813 A * | 6/1980 | Schommer | ...... 101/4 |
| 5,047,761 A | 9/1991 | Sell | |
| 5,839,810 A | 11/1998 | Hersel et al. | |
| 6,210,011 B1 * | 4/2001 | Ikeuchi et al. | ........ 362/26 |
| 6,318,872 B1 | 11/2001 | Kato et al. | |
| 6,409,355 B1 | 6/2002 | Simon et al. | |
| 6,499,852 B1 * | 12/2002 | Kino et al. | ........ 362/23 |
| 6,646,622 B1 | 11/2003 | Kronenberg et al. | |

FOREIGN PATENT DOCUMENTS

| | | |
|---|---|---|
| DE | 197 04 600 A 1 | 8/1997 |
| DE | 197 32 572 A 1 | 1/1998 |
| DE | 196 45 674 A 1 | 5/1998 |
| DE | 198 00 389 A 1 | 8/1998 |
| DE | 198 21 702 A 1 | 11/1998 |
| DE | 197 37 787 A 1 | 3/1999 |

(Continued)

OTHER PUBLICATIONS

Derwent Abstract—FR-2 761 029; Mar. 24, 1997; Magneti Marelli France Société anonyme, France.

(Continued)

*Primary Examiner*—Sandra O'Shea
*Assistant Examiner*—Mark Tsidulko

(57) ABSTRACT

The invention relates to a combined instrument including a printed board, on which a light source is provided that generates light for illuminating a display, and including a frame, inside of which the printed board is accommodated. The display field is directly mounted on the printed board and a light guide is provided, which is accommodated inside the frame in an area adjoining the printed board. The light guide is arranged in such a manner that light emitted by the light source is fed into the light guide and radiated onto the display field.

12 Claims, 2 Drawing Sheets

FOREIGN PATENT DOCUMENTS

| | | |
|---|---|---|
| DE | 197 45 900 A 1 | 5/1999 |
| DE | 198 19 393 A 1 | 11/1999 |
| DE | 196 23 406 C 2 | 6/2000 |
| DE | 100 46 237 A 1 | 4/2002 |
| FR | 2 761 029 | 3/1997 |
| FR | 2 779 683 | 6/1998 |
| GB | 1 522 542 | 8/1978 |
| JP | 102 600 63 | 9/1998 |

OTHER PUBLICATIONS

Derwent Abstract—FR-2 779 683; Jun. 16, 1998; Magneti Marelli France Société anonyme, France.

Derwent Abstract—DE-198 00 389 A1; Aug. 6, 1998; Sagem S.A., Paris, France.

Derwent Abstract—DE 196 45 674 A1; May 7, 1998; Mannesmann VDO AG, D-60388 Frankfurt, Germany.

Derwent Abstract—DE 197 45 900 A1; May 20, 1999; Robert Bosch GmbH, D-70469 Stuttgart, Germany.

Derwent Abstract—DE 198 21 702 A1; Nov. 19, 1998 Sagem S.A., Paris, France.

Derwent Abstract—DE 197 04 600 A1; Aug. 28, 1997; Sagem S.A., Paris, France.

Derwent Abstract—DE 196 23 406 C2; Jun. 21, 2000; Robert Bosch GmbH, D-70469 Stuttgart, Germany.

Derwent Abstract—DE 198 19 393 A1; Nov. 11, 1999; Robert Bosch GmbH, D-70469 Stuttgart, Germany.

Derwent Abstract—DE 197 37 787 A1; Mar. 18, 1999; Robert Bosch GmbH, D-70469 Stuttgart, Germany.

Derwent Abstract—DE 100 46 237 A1; Apr. 4, 2002; Robert Bosch GmbH, D-70469 Stuttgart, Germany.

Derwent Abstract—DE 197 32 572 A1; Jan. 29, 1998; Sagem S.A., Paris, France.

* cited by examiner

COMBINED INSTRUMENT

BACKGROUND OF THE INVENTION

The present invention relates to an instrument cluster having a printed circuit board on which a light source is provided in order to generate light for illuminating a display, and a frame in which the printed circuit board is held.

Such instrument clusters that are fitted in the dashboard of a vehicle in the visual range of the driver are known from motor vehicles. As a rule, they have a multiplicity of display panels that are accommodated in a common plastic housing and can be read off by the driver through a transparent cover. These instrument clusters provide both digital and analog display panels that display to the driver multifarious information such as, for example, vehicle speed, engine speed or tank filling level.

All the display panels share in common a dial with numerals or symbols that is arranged on the display panel and bears the luminous symbols required for identification. As a rule, the dial is a separate disk made from nonluminous material and to which an appropriate imprint for the individual variables to be displayed is applied. The display panels are arranged spaced apart in a defined fashion on a printed circuit board having a circuit arrangement and light-emitting light sources, and are surrounded by a frame having a transparent pane. The arrangement and number of the display panels to be used are determined by the number and position of the light sources to be arranged on the printed circuit board.

It is customary for this purpose to distribute the light sources behind the entire surface to be illuminated in order to ensure that the luminosity and luminance distribution of the display panels are as uniform as possible. Economizing with reference to the number of light-emitting light sources requires the use of particular light guides having light channels that, for example, guide the emitted light along a longitudinal direction and backlight the scale marks, for example, of a dial to be illuminated. As a rule, the size of the printed circuit board corresponds to the area of the display panels to be illuminated and consequently entails a high price and high manufacturing costs.

U.S. Pat. No. 6,499,852 B1 discloses for an instrument cluster an illuminating device in which a number of light sources are arranged on a printed circuit board. The printed circuit board is arranged on the outer circumference of the display panel, and the light sources are distributed along the circumference of the display panel. A reflector that is arranged along the outer circumference of the display panel reflects the light of the light sources in the direction of the middle of the display panel.

FR 2761029 A1 discloses for a motor vehicle an instrument cluster in which the display panel is formed by a plate that is designed as a light guide. A light source arranged on a printed circuit board radiates light into a light guide that is designed such that the light is deflected and coupled into the display panel.

DE 19800389 A1 discloses a dashboard that is illuminated from the front side and comprises a printed circuit board onto which conductor tracks are printed on a side pointing backward, and to which there is applied serigraphically on a side pointing forward a layer that permits the recognition of display marks, in particular the scale of a dial. The printed circuit board is fastened in a frame in which there is formed a slot in which there are arranged illuminating means that illuminate the dial from the front side. The supply of the illuminating means is performed with the aid of a flexible, compliant circuit.

SUMMARY OF THE INVENTION

It is an object of the present invention to provide an instrument cluster that has a small overall height, has a simple design and can be produced cost effectively, and whose display panels are illuminated with a homogeneous intensity of illumination.

The object is achieved according to the invention by virtue of the fact that the display panel is arranged directly on the printed circuit board, and a light guide is provided that is held in the frame in an area adjoining the printed circuit board, and the light guide is arranged in such a way that light emitted by the light source is fed into the light guide and radiated onto the display panel.

This has the advantage that it is no longer necessary for the individual display panels to be backlit since, because of the arrangement of the light sources and of the light guides surrounding the light sources, the emitted light is output in such a way that the display panels are illuminated from the front, that is to say the side facing the viewer. This results in a substantial reduction in the number of light sources and light channels. It is therefore possible to provide a printed circuit board that is populated on one side and permits the display panel to be arranged directly on the printed circuit board. Since there is no need to provide background lighting for the display panels, the latter need no longer be arranged at a spacing from the printed circuit board, and so the overall height of the instrument cluster can be substantially reduced.

The application of the display panel in the form of a dial, for example, directly on the printed circuit board results in the elimination and saving of the conventional fastening means for locking the display panels.

It is advantageous for a dial to be bonded onto the printed circuit board, or for a dial to be applied using a printing method. The dials can easily be fashioned in a variety of colors in order to improve distinction.

At the end facing the printed circuit board the frame has a light guide with an incoupling surface and outcoupling surface, the light guide deflecting the light between the incoupling surface and outcoupling surface. In an advantageous way, the end of the light guide that at least partially surrounds the light source forms the incoupling surface of the emitted light and leads the light at the required angle to the outcoupling surface at which the light is output and which illuminates the display panels arranged on the printed circuit board. In this case, the outcoupling surface can be a multiple of the incoupling surface. The outcoupling surface of the light guide can extend over relatively large areas such that various illuminations, for example punctiform, strip-shaped or two-dimensional illuminations, are possible from the point of view of the display panel, depending on the radiation angle of the light source and/or the geometry of the outcoupling surface.

A particular cost advantage results on the basis of the single-piece production, for example, using the two-component injection-molding process, of the frame and of the light guide.

The invention is explained in more detail below with the aid of the exemplary embodiment illustrated in the figures.

Identical or corresponding elements in the various figures are provided with identical reference numerals.

In the drawing:

DETAILED DESCRIPTION OF THE INVENTION

Figure 1:
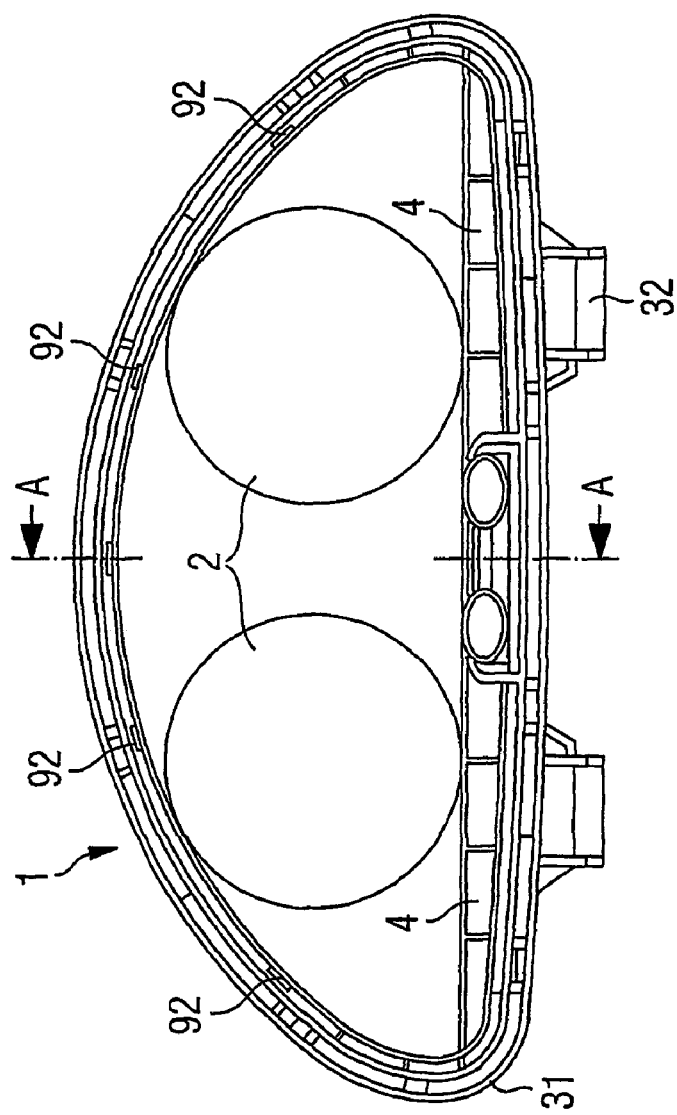
FIG. 1 shows an exemplary embodiment of the instrument cluster according to the invention.

FIG. 1 shows a plan view of the instrument cluster 1 according to the invention. The instrument cluster 1 comprises a frame 31 and a housing rear wall 32, and surrounds two display panels 2 and warning panels 4 arranged below the display panels 2.

Outcoupling surfaces 92 of light guides 9 that are not illustrated here may be seen in the outer area on the inner wall of the frame 31, a uniform illumination of the display panels 2 being effected by the light, emanating from the frame 31, emitted from these outcoupling surfaces 92.

Figure 2:
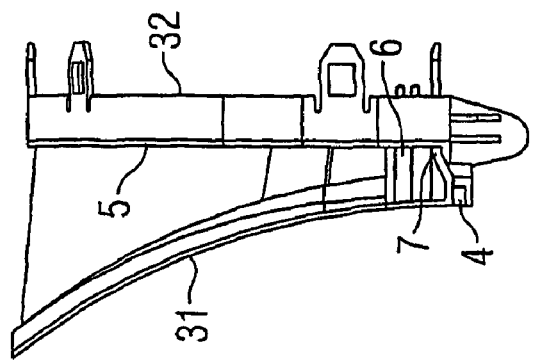
FIG. 2 shows a sectional illustration A-A of the instrument cluster illustrated in FIG. 1.

As may be seen from the sectional illustration A-A of FIG. 2 of the instrument cluster 1 illustrated in FIG. 1, it is possible to integrate into the instrument cluster 1 warning panels 4 that necessitate the conventional background lighting. As a rule, an instrument cluster 1 has individual warning panels 4, for example in order to display turn signals, hazard warning systems or lighting status, that inform the driver about normal or extraordinary operating states. The illumination of these warning panels 4 is enabled by further LEDs 7 that are arranged on a printed circuit board 5 and whose emitted light is guided via light guides 6, arranged on the rear side of the frame 31 of the instrument cluster 1, to the side of the frame 31 of the instrument cluster 1 that faces the viewer and on which an imprint of the warning panel 4 is placed at appropriate location.

Figure 3:
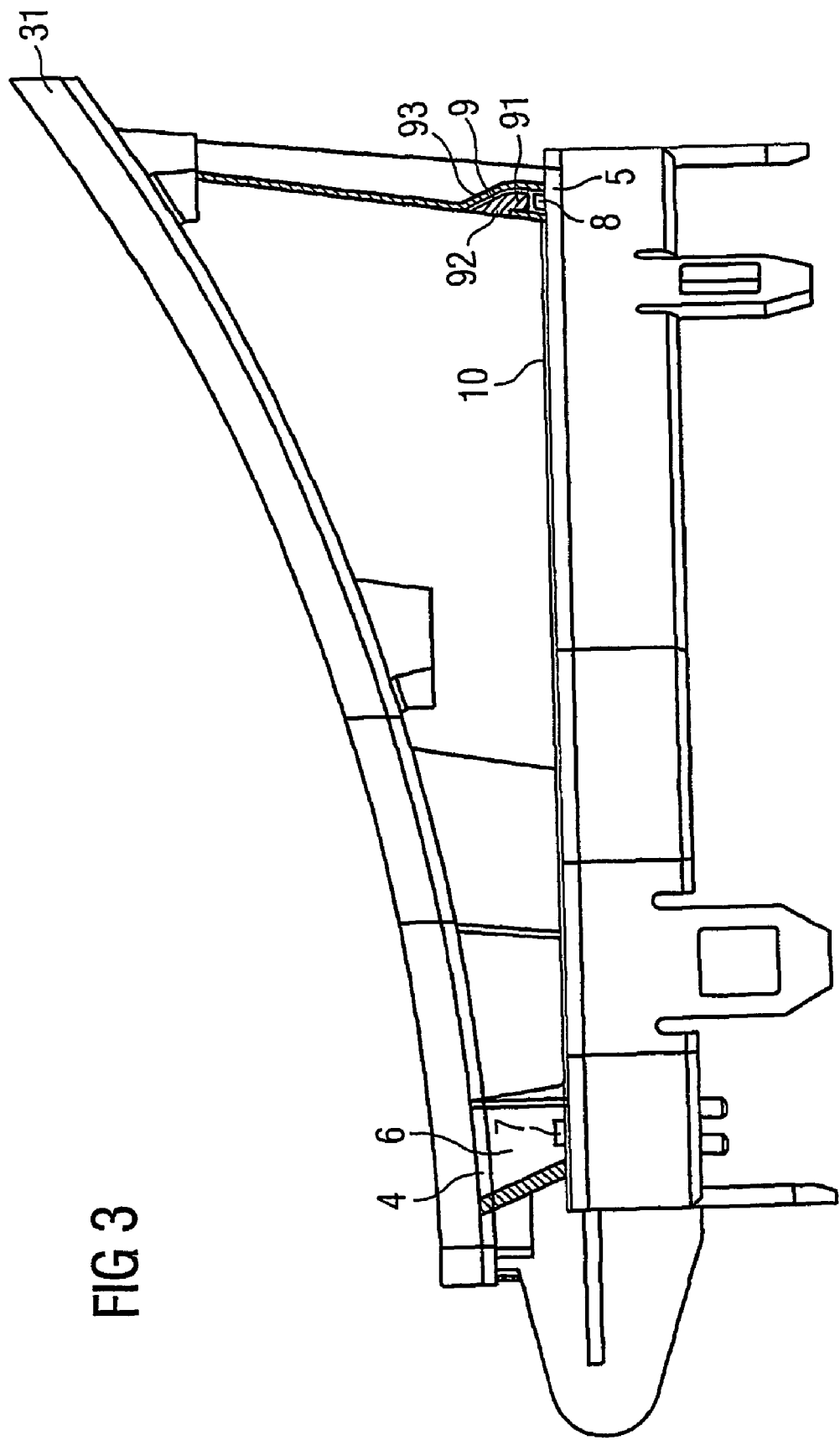
FIG. 3 shows a further sectional illustration of the instrument cluster illustrated in FIG. 1.

A further sectional illustration through the instrument cluster 1 shown in FIG. 1 is illustrated in FIG. 3. The printed circuit board 5 is arranged on the housing rear wall 32 of the instrument cluster 1. Located directly on the printed circuit board 5 is a dial 10 that has been bonded onto the printed circuit board 5 or applied onto the printed circuit board 5 using the printing method. A light-emitting light source 8, preferably an LED, is mounted in the outer area of the printed circuit board 5. The frame 31 surrounds the printed circuit board 5 and components arranged on the printed circuit board 5. One end of the frame 31 has a light guide 9, the end of the light guide 9 surrounding the LED 8 arranged on the printed circuit board, and serving as incoupling surface 91 for the emitted light. In this exemplary embodiment, the emitted light is deflected in the light guide 9 by an angle of 90° such that light emerges from the outcoupling surface 92 parallel to the display panels 2, and illuminates the surface of the display panels 2 homogeneously. However, the deflecting angle can be of any desired alignment such that, depending on what is required, the light need not be fed in parallel to the display panel 2. Since the light can be reflected at the outer inner side 93 of the light guide 9, it is possible on the basis of a freely dimensionable geometric shape of the light guide 9 to determine at which point and at which angle light fed into the incoupling surface 91 reemerges at the outcoupling surface 92.

As may be seen from FIG. 3, the overall height of the instrument cluster 1 can be substantially reduced because the display panels 2 are applied directly on the printed circuit board 5. A homogeneous illumination of the display panels 2 can be effected on the basis of the illumination of the display panels 2 via outcoupling surfaces 92 arranged in the frame 31. This leads to savings in component costs for fastening the display panels 2, and in the component costs for a multiplicity of LEDs 8 and in the outlay they require for the power supply.

The invention claimed is:

1. An instrument cluster, comprising:
a printed circuit board having a board surface,
a display panel having a first surface and a second surface and arranged directly on the board surface so that the display panel is arranged without a spacing from the printed circuit board, wherein the board surface extends across the second surface, and wherein the display panel is designed as a dial printed on the printed circuit board,
a frame in which the printed circuit board is held,
a light source arranged on the printed circuit board in order to generate light for illuminating a display, and
a light guide arranged in the frame in an area adjoining the printed circuit board such that light emitted by the light source is fed into the light guide and radiated onto the first surface of the display panel.

2. The instrument cluster according to claim 1, wherein the light guide comprises an in coupling surface and an outcoupling surface, and the light guide at least partially surrounds the light source on the printed circuit board.

3. The instrument cluster according to claim 1, wherein the light source is a light-emitting diode or a laser diode above which the light guide is arranged and which couples the emitted light directly into the light guide.

4. The instrument cluster according to claim 1, wherein the light guide is arranged to deflect the emitted light between the incoupling surface and outcoupling surface.

5. The instrument cluster according to claim 1, wherein the light guide comprises plastic in one piece with the frame.

6. The instrument cluster according to claim 5, wherein the frame and the light guide comprise one piece of a two-component injection molding.

7. An instrument cluster, comprising:
a printed circuit board having a board surface;
a display panel having a first surface and a second surface and arranged directly on the board surface so that the display panel is arranged without a spacing from the printed circuit board, wherein the board surface extends across the second surface, and wherein the display panel is designed as a dial bonded on the printed circuit board;
a frame in which the printed circuit board is held;
a light source arranged on the printed circuit board in order to generate light for illuminating a display; and
a light guide arranged in the frame in an area adjoining the printed circuit board such that light emitted by the light source is fed into the light guide and radiated onto the first surface of the display panel.

8. The instrument cluster according to claim 7, wherein the light guide comprises an incoupling surface and an outcoupling surface, and the light guide at least partially surrounds the light source on the printed circuit board.

9. The instrument cluster according to claim 7, wherein the light source is a light-emitting diode or a laser diode above which the light guide is arranged and which couples the emitted light directly into the light guide.

10. The instrument cluster according to claim 7, wherein the light guide is arranged to deflect the emitted light between the incoupling surface and outcoupling surface.

11. The instrument cluster according to claim 7, wherein the light guide comprises plastic in one piece with the frame.

12. The instrument cluster according to claim 11, wherein the frame and the light guide comprise one piece of a two-component injection molding.

* * * * *